United States Patent

[11] 3,624,309

[72] Inventor Donald J. Dattilo
Mount Prospect, Ill.

[21] Appl. No. 6,338
[22] Filed Jan. 28, 1970
[45] Patented Nov. 30, 1971
[73] Assignee Motorola, Inc.
Franklin Park, Ill.

[54] MOUNTING FOR SHIFTABLE MAGNETIC HEAD
6 Claims, 3 Drawing Figs.

[52] U.S. Cl. .......... 179/100.2CA, 274/4 A
[51] Int. Cl. .......... G11b 21/08
[50] Field of Search .......... 179/100.2 CA, 100.2 MI, 100.2 Z; 274/4, 4 A, 11, 11 A

[56] References Cited

UNITED STATES PATENTS 3,140,362 7/1964 Cheney et al. .......... 179/100.2 CA
3,370,131 2/1968 Reed .......... 179/100.2 CA

*Primary Examiner*—Bernard Konick
*Assistant Examiner*—Jay P. Lucas
*Attorney*—Mueller & Aichele

ABSTRACT: A mounting for supporting a magnetic tape head which is movable between different tracks on a multitrack magnetic tape. The mounting includes parallel spaced-apart plates formed of a sheet metal stampings. The plates have struck-out portions at their ends to form extension tabs which engage with notched members, one of which is pivotally secured to a standard and the other of which is secured to the magnetic tape head. Each of the notched members is also of a sheet metal stamping with portions thereof bent to the desired configuration. The linkage formed by the plates and the notched members maintains the face of the magnetic tape head substantially parallel to the plane of the magnetic tape engaged therewith in all positions of the head, and prevents torsional rotation thereof while the head is being moved from one position to another position.

PATENTED NOV 30 1971 3,624,309

INVENTOR.
DONALD J. DATTILO
BY Mueller, Aichele & Rauner
ATTORNEYS.

MOUNTING FOR SHIFTABLE MAGNETIC HEAD

BACKGROUND OF THE INVENTION

This invention relates generally to a mounting for a magnetic tape head which is shiftable to a plurality of locations to engage respective different tracks on a magnetic tape, and more particularly to a mounting of a magnetic tape head used in a cartridge-type tape player.

Although the mounting of this invention has particular utility when used in conjunction with cartridge-type multitrack tape players, the simplicity of design and low cost of the mounting of this invention will enable it to be used in conventional tape players as well as video tape players, or the like.

Cartridge-type tape players, for example, used in automobile installations, generally require a mounting mechanism for the magnetic tape head which allows selective movement of the magnetic tape head to the various spatial positions associated with the several tracks on a magnetic tape which is transported past and in contact with the magnetic tape head. Heretofore, such mountings for magnetic tape heads of the above-mentioned type utilized several die-cast and machined parts to form linkage connections between a stationary member secured to the tape player and the rear end of the magnetic tape head. These various die-cast and machined parts, being many in number, required several machining operations to form the parts and thereafter required substantial time of assembly personnel to put the parts together to form the mounting. Additionally, some mountings of the prior art, because of their inherent design, do not provide means for adjusting the longitudinal relationship of the tracks of the magnetic tape with that of the pickup portions on the magnetic tape head.

SUMMARY OF THE INVENTION

Accordingly, it is an object of this invention to provide a mounting for a magnetic tape head which is shiftable to position the tape head to the different tracks on a multitrack magnetic tape and which is inexpensive to manufacture, efficient and reliable in operation and which can be assembled quickly and easily into the player.

A feature of this invention is the use of sheet metal stampings to form a pair of parallel spaced-apart plates which engage notch-engaging means which are also formed of sheet metal stampings. The plates form part of a pantograph which maintains linear movement of the magnetic tape head over a limited range of movement.

DESCRIPTION OF THE PREFERRED EMBODIMENT

Figure 1:
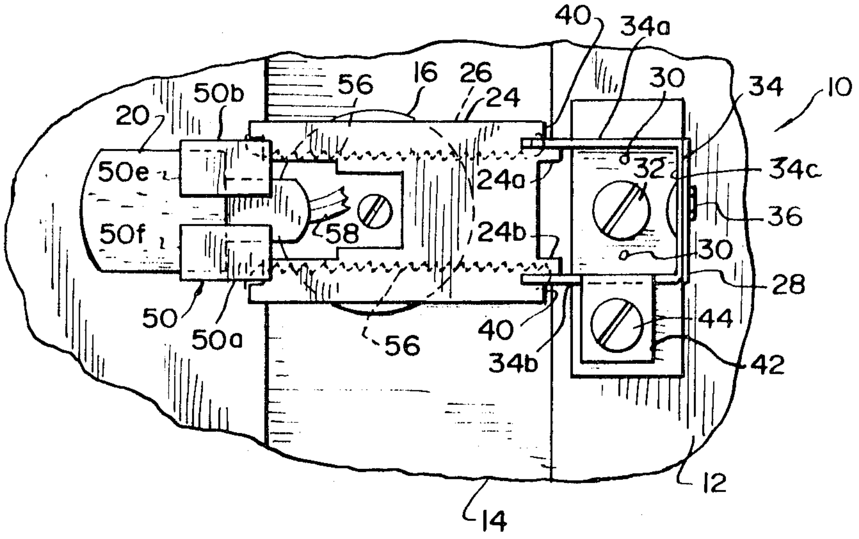
FIG. 1 is a top view of a mounting for a magnetic tape head with only a portion of the support surface illustrated therein.
Figure 2:
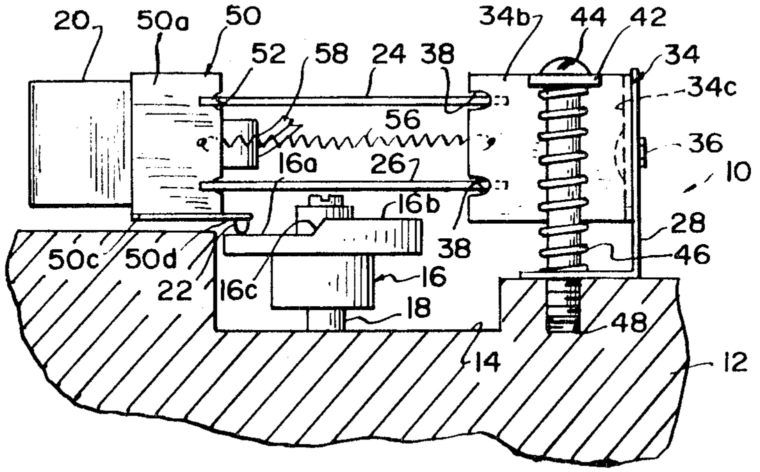
FIG. 2 is a side elevational view of FIG 1.

Referring now to FIGS. 1 and 2, a fragmentary portion of the magnetic tape player is designated generally by reference number 10 and has a support member 12 in which is formed a recessed portion 14. A cam wheel 16 rotated by a shaft 18 is located within the recessed portion 14 and actuated by suitable solenoid means, not shown, to shift a tape head 20 from one location to the next. The cam 16 is herein illustrated as having a first surface 16*a* corresponding to one position of the magnetic tape head 20 and a second surface 16*b* corresponding to another position of the head 20 with a gradual incline 16*c* connecting the two surfaces 16*a* and 16*b*. However, it will be understood that in the case of an eight-track tape player the cam 16 may have four surfaces to correspond to the four different positions of the tape head 20. A cam follower 22 extends from the tape head 20 and engages the respective surfaces of the cam 16 to cause movement of the head 20 upon rotation of the cam.

Figure 3:
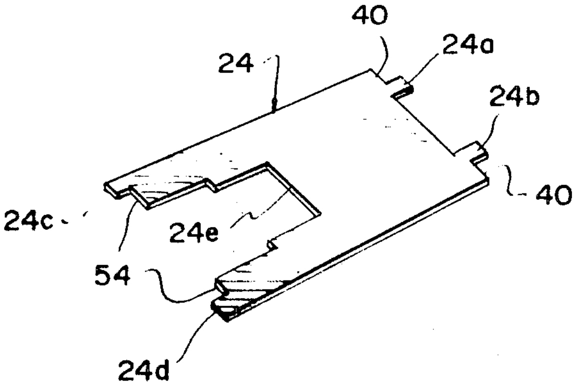
FIG. 3 is a perspective view illustrating one of the sheet metal stamped plates used in the mounting of FIGS. 1 and 2.

In accordance with this invention, a pair of substantially parallel, spaced-apart plates 24 and 26 provide a movable mounting for the magnetic tape head 20. At best illustrated in FIG. 3 the plates 24 and 26 are formed of stamped sheet metal, and, as such, are inexpensive and easy to manufacture. Since the plates 24 and 26 are preferably identical in configuration, only the plate 24 is illustrated in FIG. 3. Here it can be seen that one end of plate 24 has a struck-out portion which forms rearwardly extending members 24*a* and 24*b*, and the forward end of the plate 24 has a struck-out portion which forms the forwardly extending members 24*c* and 24*d*. Preferably, a substantial portion of the plate between the members 24*c* and 24*d* thereof is struck out to form an opening 24*e*.

Also in accordance with this invention a standard 28 formed of a sheet metal stamping is secured to the support 12 by a mounting screw 32 and a pair of locating pins 30 as best seen in FIG. 1. A first notch-engaging means 34 is formed of a sheet metal stamping and bent in configuration to form confronting side walls 34*a* and 34*b* connected together by a web portion 34*c*. The web portion 34*c* abuts with the standard 28 and is pivotally secured thereto by a rivet 36. The notch-engaging member 34 rotates about the axis of the rivet 36 in an adjustable manner to provide rotatable azimuth adjustment of the magnetic tape head 20 to align the pickup portions thereof with the longitudinal axis of the various tracks on the magnetic tape which is transported past the magnetic head 20. To provide a substantially rigid torsional connection between the notch-engaging member 34 and the magnetic head 20, the rearwardly extending portions 24*a* and 24*b* of the plate 24, as well as the corresponding rearwardly extending portions of the plate 26, are confined inwardly of the confronting wall portions 34*a* and 34*b* and notches 38 formed in these wall portions receive shoulders 40 formed on the plates 24 and 26. Therefore, the connection between the notches 38 and the extended portions 24*a* and 24*b* together with the shoulders 40 allow pivotal movement of the plates 24 and 26 only through a small arcuate path which is along an axis substantially parallel to the standard 28 and yet limit transverse movement of the plates 24 and 26, that is, these components provide a simple way to form a pantograph.

A tap member 42 is also formed by the sheet metal stamping forming the notch-engaging member 34 and extends from the side wall 34*b* to receive an adjusting screw 44 therethrough. A spring 46 is positioned about the shaft of the adjusting screw 44 to provide mechanical bias on the notch-engaging member 34 to rotate it about the axis of the rivet 36. Here it is illustrated that the adjusting screw 44 threadedly engages a hole 48 formed in the support 12.

A second notch-engaging member 50 is formed of a sheet metal stamping and bent to form three sidewalls 50*a*, 50*b* and 50*c* which partially circumscribes the rear end portion of the magnetic tape head 20 and preferably is firmly held to the head by the spring action formed by the bent wall portions. To further facilitate holding of the notch-engaging member 50 to the tape head 20 confronting clamping portions 50*e* and 50*f* are provided. The wall portion 50*c* has an extended portion 50*d* which receives the cam follower 22 to move the magnetic tape head 20 upon rotation of the cam wheel 16.

Here also, notches 52 are formed in the sidewalls 50*a* and 50*b* to receive shoulder portions 54 formed at the front end at each of the plates 24 and 26. However, in this instance it will be noted that the forwardly extended portions 24*c* and 24*d* are confined outwardly of the wall portions 50*a* and 50*b* to limit transverse movement of the head 20 relative to the plates 24 and 26. The linkage connection formed by the plates 24 and 26 form a pantograph with the plates 24 and 26 pivoting within the notches 38 and 52 which provides substantially vertical movement of the head 20 as it is positioned to the different tracks on the tape as described in application Ser. No. 567,126, filed July 22, 1966 now abandoned in favor of continuation application Ser. No. 866,078, and assigned to the assignee of this application. At the same time the plates limit the transverse movement of the head 20. Signals induced into the tape head 20 are translated along a cable 58 which may, if desired, extend through the opening formed by the notch *24e* within the upper plate 24.

Accordingly, the magnetic tape head 20 is firmly mounted to the support 12 by means of the pair of parallel spaced-apart plates 24 and 26 together with the notch-receiving members 34 and 50 and standard 28 all of which are preferably stamped sheet metal members.

I claim:

1. A mounting for a magnetic tape head movable to cooperate with different tracks on a multitrack magnetic tape, and actuating means for selectively shifting the position of said magnetic tape head to the different tracks, the combination including, a support surface, a standard extending from said support surface, first notch-engaging means formed on said standard;

a pair of parallel spaced-apart rigid plates each having first and second struck-out portions, said first struck-out portion of each plate engaged with said first notch-engaging means to allow limited pivotal movement of said plates along an axis substantially parallel to said standard and to limit movement of said plates transversely of said standard;

tape head-mounting means on said magnetic tape head for mounting the same to said plates, said means having a second notch-engaging means formed thereon pivotally receiving said second struck-out portion of each of said plates, said first and second plates said standard and said tape head-mounting means forming a pantograph for maintaining the cooperation of the tape head to the different tracks on the tape with the same being shifted therebetween.

2. The mounting of claim 1 wherein said first notch-engaging means is a sheet metal stamping having sidewalls bent in confronting relation and extending toward the magnetic tape head;

said first struck-out portion of said plates forming extensions which are confined between said sidewalls to limit transverse movement of said plates relative to said standard.

3. The mounting of claim 2 including a web portion formed between said confronting sidewalls;

means pivotally connecting said web portion to said standard to provide rotation of said web portion and said confronting sidewalls about an axis perpendicular to said standard and extending toward the magnetic tape head;

a tab extending from one of said sidewalls;

and adjusting means engaged with said tab to adjustably rotate said first notch-engaging means to correspondingly rotate the magnetic tape head to align the same with the recording tracks on the tape to be engaged with the magnetic tape head.

4. The mounting of claim 1 wherein said second notch-engaging means is a sheet metal stamping having at least three wall portions to embrace and hold the magnetic tape head, two of said three wall portions forming opposing walls, said second struck-out portion of said plates forming extensions which are positioned outwardly of opposing walls to limit transverse movement of said plates relative to said magnetic tape head.

5. The mounting of claim 1 including spring means connected between said first and second notch-engaging means to urge the magnetic tape head toward said standard to confine said first and second rigid plates at their ends with the respective first and second notch-engaging means.

6. The mounting of claim 1 wherein said parallel spaced-apart rigid plates are formed of sheet metal stampings and said first struck-out portion of said plates form extensions which are confined inwardly of sidewalls formed by said first notch-engaging means, and said second struck-out portions of said plates form extensions to be confined outwardly of wall forming portions of said second notch-engaging means.

* * * * *